US008340157B2

(12) United States Patent
Arvidsson et al.

(10) Patent No.: US 8,340,157 B2
(45) Date of Patent: Dec. 25, 2012

(54) METHODS AND DEVICES FOR WIRELESS COMMUNICATION IN WIRELESS COMMUNICATION SYSTEMS

(75) Inventors: Niclas Arvidsson, Uddevalla (SE); Daniel Benjamin Darrington, London (GB)

(73) Assignee: Interlite Aktiebolag, Uddevalla (SE)

(*) Notice: Subject to any disclaimer, the term of this patent is extended or adjusted under 35 U.S.C. 154(b) by 480 days.

(21) Appl. No.: 12/458,922

(22) Filed: Jul. 28, 2009

(65) Prior Publication Data

US 2011/0026564 A1    Feb. 3, 2011

(51) Int. Cl.
*H04B 1/00* (2006.01)
*H04L 27/00* (2006.01)

(52) U.S. Cl. .......................... 375/133; 375/130; 375/259

(58) Field of Classification Search .................. 375/133, 375/130, 259
See application file for complete search history.

(56) References Cited

U.S. PATENT DOCUMENTS

| 2005/0286646 | A1  | 12/2005 | Fails et al. |
| 2006/0227741 | A1* | 10/2006 | Lappetelainen .............. 370/329 |
| 2008/0170601 | A1  | 7/2008  | Fails et al. |
| 2008/0285490 | A1* | 11/2008 | Mukai et al. ................. 370/280 |
| 2010/0318957 | A1* | 12/2010 | Akkiraju et al. ............. 717/102 |

FOREIGN PATENT DOCUMENTS

| GB | 2399982 A | * | 9/2004 |
| GB | 2 406 479 | | 3/2005 |
| WO | WO 2005/099174 | | 10/2005 |

OTHER PUBLICATIONS

International Search Report dated Nov. 26, 2010.
Written Opinion dated Nov. 26, 2010.
"You Can Send DMX512 WithOut Wires Using Spread Spectrum Radio Techniques", Goddard Design Co., 1995.

* cited by examiner

*Primary Examiner* — David C. Payne
*Assistant Examiner* — Brian J Stevens
(74) *Attorney, Agent, or Firm* — Harness, Dickey & Pierce, PLC

(57) ABSTRACT

A method for wireless communication in a wireless communication system may include receiving signal contributions from within a predefined frequency range, categorizing the received signal contributions in a plurality of different frequency bands being sub-bands of the frequency range, comparing content in each of the plurality of sub-bands with a predetermined criteria, selecting a sub-set of the plurality of sub-bands corresponding to the criteria, determining a frequency hopping pattern based on the selected sub-set of sub-bands, generating a frequency key including information as to the selected sub-set of sub-bands and frequency hopping pattern, and broadcasting the frequency key to nodes of the wireless communication system. A wireless communication device for wireless communication in a wireless communication system may include an antenna, a receiver module connected to the antenna, a control unit connected to the receiver module, and a transmitter module connected to the control unit and antenna.

20 Claims, 2 Drawing Sheets

METHODS AND DEVICES FOR WIRELESS COMMUNICATION IN WIRELESS COMMUNICATION SYSTEMS

TECHNICAL FIELD

The present invention relates to a method for facilitating wireless communication. In particular, the present invention relates to a method for determining a set of frequency bands suitable for wireless communication, in order to communicate with low packet loss in unlicensed frequency bands. The invention also relates to a corresponding wireless communication device.

BACKGROUND OF THE INVENTION

With the rapid development of new luminaires based on new emission technologies an increased number of control options become available within the entertainment, architectural, commercial, industrial, street and event industries. For controlling the different devices used, by means of e.g. digital control signals according to a predefined protocol, a mixture of wired and wireless technologies may be used, with a trend to move towards the sole use of wireless transmission technologies focusing mainly on transmission within the 900 MHz and 2.4 GHz frequency bands.

Generally, wireless communication systems comprise, on one side, a wireless transmitter module connected to a control device and, on the other side, one or a plurality of wireless receivers modules each connected to independently controllable devices, for example, selected from the above mentioned luminaires for allowing unidirectional transmission of control signals. Depending on the predefined protocol, both sides may instead (or also in a mixed manner) be equipped with wireless transceivers for allowing bi-directional transmission of control signals between the control device and the controllable device(s). Such wireless communication systems for the entertainment, architectural, commercial, industrial, street, and event industries are well known by the skilled addressee, for example, earlier disclosed by Goddard Design Company in relation to their Digital Multiplex (DMX) With-Out Wires (DMX WOW) concept disclosed in 1995. A similar system has also been disclosed in U.S. Patent Publication No. 2005/0286646 A1.

Even though the wireless communication systems disclosed by Goddard Design Company and in US 2005/286646 provides a possibility to move towards wireless control of e.g. luminaires and similar devices within the entertainment, architectural, commercial, industrial, street and event industries, they fails to provide solutions to the increasingly complex problem of crowded wireless transmission space. Thus, there is a need for a more reliable wireless transmission method, specifically for providing increased reliability in relation to e.g. stage automation, industrial lighting, office lighting and home automation.

SUMMARY OF THE INVENTION

According to an aspect of the invention, the above is at least partly met by a method for wireless communication in a wireless communication system, comprising receiving signal contributions from within a predefined frequency range, categorizing the received signal contributions in a plurality of different frequency bands being sub-bands of the predefined frequency range, comparing the content in each of the sub-bands with a predetermined criteria, selecting a sub-set of the plurality of sub-bands corresponding to the predetermined criteria, generating a frequency key comprising information as to the selected sub-set of sub-bands, and broadcasting the frequency key to a plurality of nodes of the wireless communication system.

The general concept of the present invention is based on the fact that it may be possible to increase the reliability of wireless transmission in a wireless communication system possibly configured to use in at least one of the entertainment, architectural, commercial, industrial, street and event industry environment, having specific and in comparison very high reliability demands in comparison to "normal" wireless communication where the "real-time" factor is not as critical, the invention allows for minimization of the latency in transmission of control signals for keeping it low and well defined. Similar areas include e.g. stage and concert lighting, theme-park lighting, cruise ship lighting etc. Thus, according to the invention, a plurality of signal contributions from within a predefined frequency range are "windowed" into different sub-bands, each comprising a frequency range portion of the predetermined frequency range, and thereafter compared with a predetermined criteria, e.g. by measuring the average noise power in each frequency range portion of the predetermined frequency range, such that a sub-set of the sub-bands may be selected as to being more suitable for wireless communication by the nodes of the wireless communication system. As noted, information relating to the selected sub-set of sub-bands is broadcasted to the nodes of the wireless communication system. Accordingly, an adaptive selection of the most suitable sub-bands is provided. Furthermore, the invention provides improvements in relation to e.g. interference with co-existing wireless communication system, as well as in setting up complex wireless environment comprising a plurality of co-existing wireless communication systems.

Within the context of the invention it should be noted that the definition of "signal contributions" comprise signals relating to nodes within the wireless communication system, as well as signals and noise generated by other signal sources, e.g. other wireless communication devices, consumer electronics such as a microwave oven, etc.

In an embodiment, the predefined frequency range comprises at least one of the 2.4 GHz Industrial, Scientific, and Medical (ISM) frequency band and the 5.8 GHz ISM frequency band. Both frequency bands, as well as possibly other future wireless communication bands, are within the scope of the invention. The use of multiple frequency bands in combination with the inventive concept of adaptive sub-band selection further improves the reliability of wireless transmissions in a wireless communication system for controlling devices of a wireless communication system, possibly configured for at least one of an entertainment, architectural, commercial, industrial, street, and event industry environment.

Preferably, the step of categorizing the received signal contributions comprises determining the average power of the received signal contributions. The determination of the average signal power within a sub-band essentially determines the amount of "interference" in that sub-band. It is as an alternative also possible to categorize the signal contributions by means of an "ask-listen" approach. According to such a concept it may be possible to e.g. broadcast on a channel/sub-band, and listen for a response. If there is a response then that channel/sub-band is clear, if however the response is not there then it is corrupt etc. and not a suitable channel/sub-band for communication. Accordingly, selection of only a sub-set of the plurality of sub-bands prevents the nodes from transmitting on undesirable frequency channels. Furthermore, it is desirable to determine a frequency hopping pattern based on the selected sub-set of sub-bands and including the frequency hopping pattern with the frequency key. For keeping the frequency hopping pattern up to date and adaptable to changes in the "wireless environment", the method is preferably executed at least at one of a startup of the wireless communication system, a predefined interval, an introduction of nodes to the wireless communication system, and a removal of nodes from the wireless communication system. The predefined interval may e.g. preferably be between 1 second and 3 hours and more preferably between 1 minutes and 1 hour. Other intervals are possible and within the scope of the invention and be selected to suit the present implementation.

According to another aspect of the invention there is provided a wireless communication device for wireless communication in a wireless communication system, comprising an antenna, a receiver module connected to the antenna and configured to receive signal contributions from within a predefined frequency range, a control unit connected to the receiver module and configured to categorize the received signal contributions in a plurality of different frequency bands being sub-bands of the predefined frequency range, compare the content in each of the plurality of sub-bands with a predetermined criteria, select a sub-set of the plurality of sub-bands corresponding to the predetermined criteria, and generate a frequency key comprising information as to the selected sub-set of sub-bands, and a transmitter module connected to the control unit and the antenna and configured to broadcast the frequency key to a plurality of nodes of the wireless communication system. This aspect of the invention provides similar advantages as discussed above in relation to the previous aspect of the invention. It should be noted that the functionality of the control unit may be incorporated with either or both or divided between the receiver and the transmitter modules in which way best suits the implementation of the wireless communication device of the invention.

Preferably, the wireless communication device is arranged as a wireless transceiver. However, the functionality of the wireless communication device may be included in other similar wireless communication devices.

Additionally, the wireless communication device may be arranged as a possibly administrative part of a wireless communication system as discussed above, further comprising a plurality of wireless nodes wirelessly connected to the wireless communication device for forming a wireless network. The wireless communication system may preferably be configured for at least one of an entertainment, architectural, commercial, industrial, street, and event industry environment, and may thus be configured to relay control signals and data relating to at least one of the DMX512 protocol, the DMX512A protocol, the Remote Device Management (RDM) protocol, the Architecture for Control Networks (ACN) protocol, the KNX protocol (an open, worldwide standard for home and building control), the Digital Addressable Lighting Interface (DALI) protocol, and/or the Digital Signal Interface (DSI) protocol. Additional future protocols for at least one of the entertainment, architectural, commercial, industrial, street, and event industry environment are also within the scope of the invention. Also, the wireless network may be arranged as a wireless mesh network for further improving the communicational capability of the wireless communication system, for example, in such a case where one of a plurality of the nodes are not within line of sight in regards to the wireless communication device. In such a case, the nodes of the wireless communication system may be adapted to relay control signals from the wireless communication device to the node(s) not within line of sight of the wireless communication device. Additionally, mesh configuration of the wireless network further extends the possible distance between the wireless communication device and nodes of the wireless communication system.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
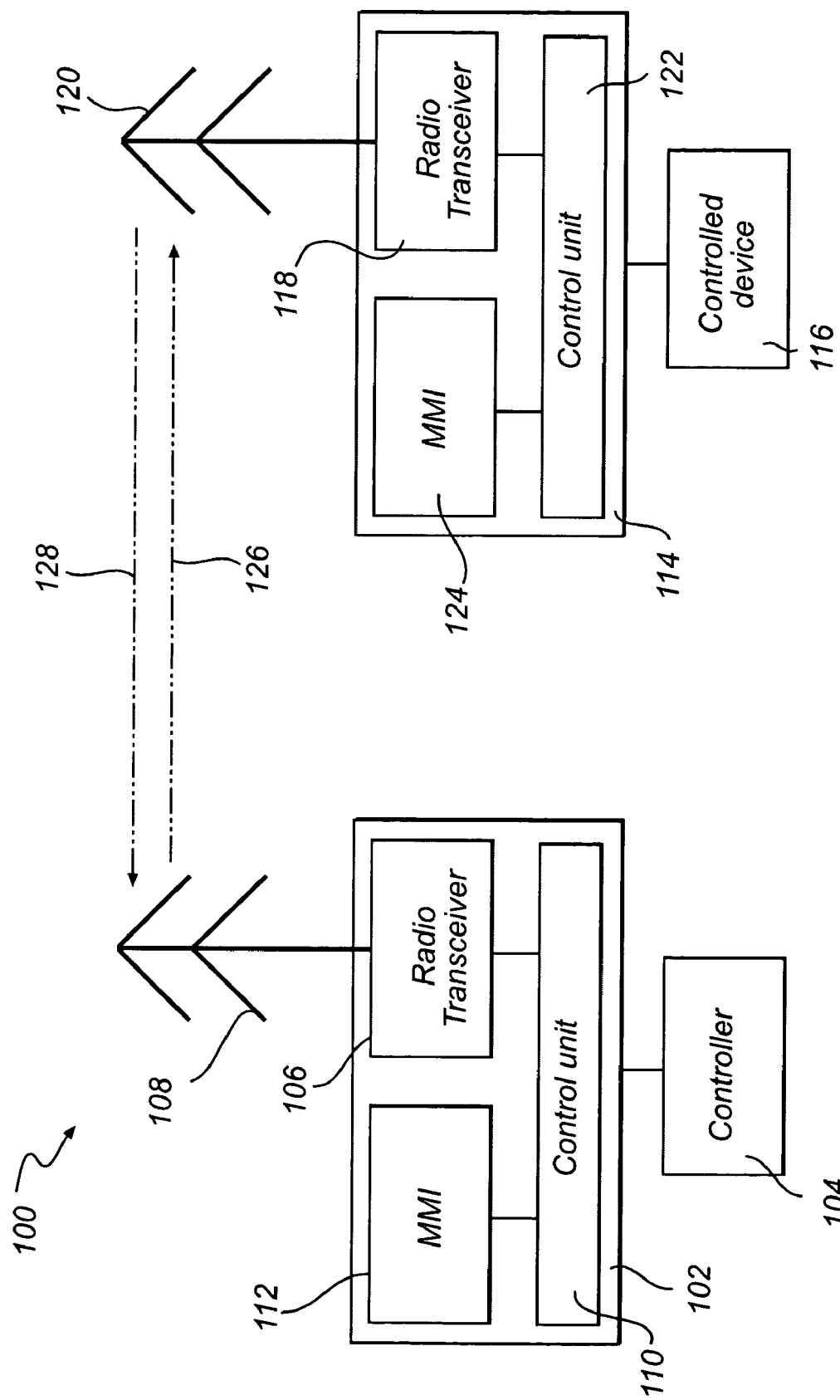
FIG. 1 illustrates a wireless communication system comprising an wireless communication device and a plurality of wireless nodes according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to those skilled in the art. Like reference characters refer to like elements throughout.

Referring now to the drawings and FIG. 1 in particular, there is depicted a wireless communication system 100 for use in wireless communication of control signals and data within e.g. the 2.4 GHz ISM frequency band and/or the 5.8 GHz ISM frequency band. The wireless communication system 100 comprises a first wireless communication device 102 (forming a "master node") configured to allow wireless communication of control signals and data from (and optionally to) a controller 104. The first wireless communication device 102 comprises a radio transceiver 106, an antenna 108 connected to the radio transceiver 106, a control unit 10 connected to the radio transceiver 106, and a Man Machine Interface (MMI) 112 connected to the control unit 100.

The wireless communication device 100 further comprises a second wireless communication device 114 (forming a "slave node") for providing control signals and data to (and optionally from) a controlled device 116. Similarly to the first wireless communication device 102, the second wireless communication device 114 comprises a radio transceiver 118, an antenna 120 connected to the radio transceiver 118, and a control unit 122 connected to the radio transceiver 118. The second wireless communication device 114 also (optionally) comprises an MMI 124.

The wireless communication system 100 may comprise further nodes (e.g. both master and slave nodes), e.g. wireless communication devices similar to the second wireless communication device 114 each connected to one or a plurality of controlled devices. The slave nodes may also (or instead) be solely adapted to receive control signals and data from a master node, in essence not solely comprising means for receiving wireless signals. The number of nodes in a wireless communication system 100 according to the invention may depend on the number of controlled devices that need to be individually controlled. A node may also be adapted to control more than one single controlled device.

The MMI 112 and MMI 124 of the first 102 and the second 114 wireless communication devices may include e.g. display means and light sources for allowing a user to easily monitor at least some basic settings of the wireless communication devices. In some embodiments, the functionality of the first 102 and the second 114 wireless communication devices may be integrated with the controller 104 and the controlled device 116, respectively. In such embodiments the MMI 112 and MMI 124 may be optional. Additionally, the control units 110, 122 may each include a microprocessor, microcontroller, programmable digital signal processor or another programmable device. The control units 110, 122 may also, or instead, each include an application specific integrated circuit, a programmable gate array or programmable array logic, a programmable logic device, or a digital signal processor. Where the control units 110, 122 each includes a programmable device such as the microprocessor, microcontroller or programmable digital signal processor mentioned above, the processor may further include computer executable code that controls operation of the programmable device.

In a wireless communication scenario where the first 102 and the second 114 wireless communication devices form a wireless network, control signals and data are, e.g., initiated from the controller 104 for controlling the controlled device 116. The control signals and data will be processed by the control unit 110. The processed control signals and data will be provided to the radio transceiver 106 for arrangement in a format suitable for wireless, e.g., radio frequency (RF) transmission. The antenna 108 will transmit RF signals 126 to the antenna 120 of the second wireless communication device 114 for provision to the radio transceiver 118 where they will be processed and provided to the control unit 122. The control unit 122 will in turn provide the processed control signals and data corresponding to the control signals and data initiated by the controller 104 to the controlled device 116.

The controlled device 116 may in turn respond to the information (e.g. control signals and data) provided by the controller 104, or alternatively initiate communication with the master device by its own means, by forming (response) information (e.g. control signals and data transmitted in response or by its own mean) that will be provided to the control unit 122, to the radio transceiver 118, by means of the antenna 120 be transmitted as e.g. RF signals 128 to the antenna 108 of the first wireless communication device 102. The antenna 108 will forward the signals to the radio transceiver 106, to the control unit 110 and back to the controller 104.

In essence, the first 102 and the second 114 wireless communication devices may be said to be transparent to the control signals and data provided from the controller 104 to the controlled device 116, and from the controlled device 116 to the controller 104, essentially forming a wire replacement for communication between the controller 104 and the controlled device 116. The controller 104 may, e.g., be a personal computer (PC) having software for generating adequate control signals and data suitable for controlling a controlled device such as, e.g., a controllable luminaire used within the entertainment, architectural, commercial, industrial, street, and event industries, etc. Other controller and controllable devices are of course possible and within the scope of the invention. Examples of controllable devices include, e.g., advanced fixtures and special effects devices such as fog machines and moving lights. Depending on the protocol used by the controller and the controllable device, which as noted above will be processed by the respective control units for adaptation to a suitable wireless communication protocol, e.g., *Institute of Electrical and Electronics Engineers* (IEEE) 802.11, may allow for unidirectional (e.g., DMX512, DMX512A) or bi-directional (e.g., RDM, ACN, etc.) transmission of information from the controller to the controllable device and vice versa.

In some embodiments involving bi-directional communication, a wireless communication device in itself may be adapted to respond to information provided by another wireless communication device, e.g., connected to a controller. As an example, the controller 104 (or the wireless communication device 102) may initiate a request for the second wireless communication device 114 to respond with its level of reception back to the controller, even within the context of transmission of signals within the RDM protocol. In such a case the second wireless communication device 114 is not transparent to signals from the controller 104, but rather provides valuable information back to the controller 104. Also, the controlled device 116 may comprise a plurality of control devices, possibly providing for "injection" of RDM packets without modifying DMX data being transmitted over a DMX line.

The level of reception, e.g. a low level of reception, may be used for initiating the operational step of the invention, i.e. to determine the most suitable frequency channels to use for transmission between the wireless communications devices (e.g. master and slave nodes such as the first wireless communication device 102 and the second wireless communication device 114, respectively) of the wireless communication system 100. Other means for initiating the steps of the invention for determining the most suitable frequency channels includes e.g. least at one of a startup of the wireless communication system, a predefined interval, an introduction of nodes to the wireless communication system, and a removal of nodes from the wireless communication system.

Figure 2:
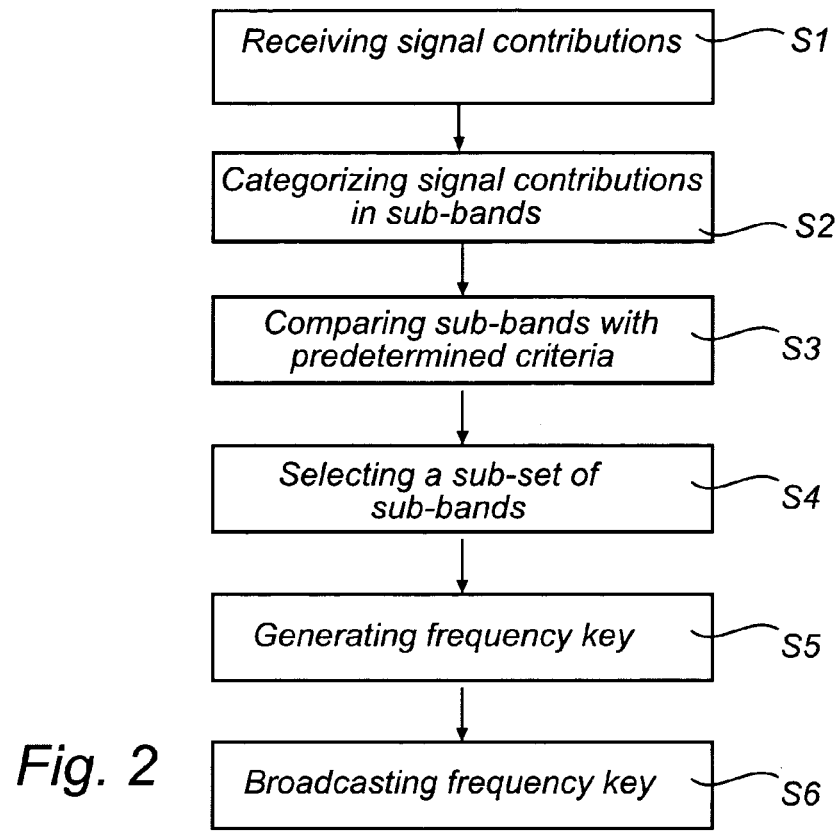
FIG. 2 is a flow chart illustrating the control steps of a control unit comprised with a wireless communication device according to the invention.
Figure 3:
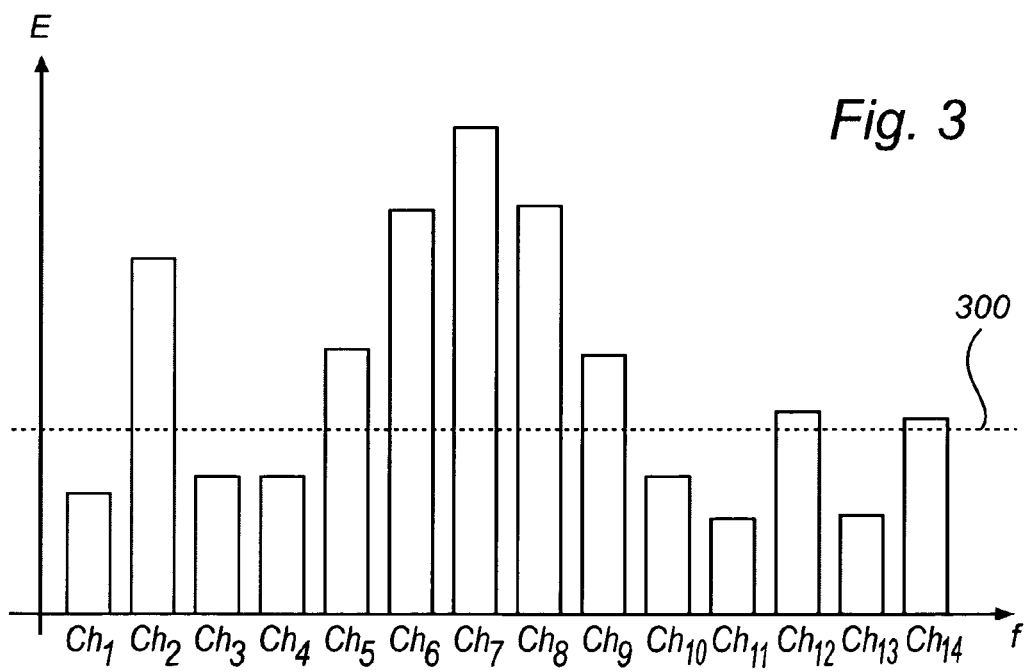
FIG. 3 is a diagram illustrating a plurality of sub-bands.

During operation, with reference to FIGS. 2 and 3 in parallel, the master node of the wireless communication system 100, e.g. wireless communication device 102 will start by receiving signal contributions, S1, from within a predefined frequency range which preferably correspond to e.g. the 2.4 GHz ISM frequency band and/or the 5.8 GHz ISM frequency band used for wireless communication of control signals and data within the wireless communication system 100.

The received signal contributions are categorized, S2, in a plurality of different frequency bands being sub-bands, e.g. $Ch_1$-$Ch_{14}$, of the predefined frequency range, for example by determining the average power of the received signal contributions within channels $Ch_1$-$Ch_{14}$. As discussed above, the average power content in each channel is dependent on signals relating to nodes within the wireless communication system 100, as well as signals and noise generated by other signal sources (e.g. of other external wireless communication systems), e.g. other wireless communication devices, consumer electronics such as a microwave oven, etc. In the present example, 14 channels/sub-bands bands are illustrated in FIG. 3. However, a larger plurality of channels/sub-bands as well as fewer channels/sub-bands are possible and within the scope of the invention.

Following the categorization of the signal contributions, the content in each of the plurality of sub-bands is compared, S3, with a predetermined criterion, where the predetermined criterion for example may be a predetermined threshold level 300 in relation to the average power of the received signals in each of the channels $Ch_1$-$Ch_{14}$.

Subsequently, the step of comparing with a predetermined criterion (such as predetermined threshold level 300), a sub-set of the plurality of channels/sub-bands corresponding to the predetermined criteria are selected, S4. In the illustrated embodiment, the channels having an average power content being less than the predetermined criterion are selected, e.g., $Ch_1$, $Ch_3$, $Ch_4$, $Ch_{10}$, $Ch_{11}$, and $Ch_{13}$. Thus, six channels are selected and form the sub-set of channels/sub-bands. Other criteria for selecting the channels are of course possible, e.g., including sorting the channels based on the average power content and selecting a predetermined number of channels having the least average power content.

Based on the selected channels, a frequency key comprising information as to the selected sub-set of channels, e.g. $Ch_1$, $Ch_3$, $Ch_4$, $Ch_{10}$, $Ch_{11}$, and $Ch_{13}$, is generated, S5. The frequency key may also comprise a frequency hopping pattern based on the selected sub-set of channels e.g. determined subsequently of selecting the sub-set of channels.

Finally, the frequency key is broadcasted, S6, to the (slave) nodes of the wireless communication system 100, and wireless communication will commence at the selected channels. The communication may preferably comprise error correction and the possibility to resend not correctly received control signals and data. However, in a unidirectional implementation of the wireless communication system, the communication may lack such possibilities.

The person skilled in the art realizes that the present invention is not limited to the preferred embodiments. For example, it may be possible to allow for the wireless communication device according to the invention to be configured to transmit/receive wired and/or wireless signals to/from other adjacently arranged "master" nodes each controlling separate wireless communication networks. The wired/wireless signals between different master nodes may include information as to different frequency keys of the different wireless communication networks for further improving the communication within a wireless communication network. More specifically, the sharing of the frequency keys between different wireless networks may be used in sharing the available RF transmission space/channels.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims. Also, the disclosed method steps may be executed in any different order.

The invention claimed is:

1. A method for wireless communication in a wireless communication system, the method comprising:
   receiving signal contributions from within a predefined frequency range;
   categorizing the received signal contributions in a plurality of different frequency bands being sub-bands of the predefined frequency range;
   comparing content in each of the plurality of sub-bands with a predetermined criteria;
   selecting a sub-set of the plurality of sub-bands corresponding to the predetermined criteria;
   determining a frequency hopping pattern based on the selected sub-set of sub-bands;
   generating a frequency key comprising information as to the selected sub-set of sub-bands and the frequency hopping pattern; and
   broadcasting the frequency key to a plurality of nodes of the wireless communication system.

2. The method of claim 1, wherein the predefined frequency range comprises at least one of the 2.4 GHz Industrial, Scientific, and Medical (ISM) frequency band and the 5.8 GHz ISM frequency band.

3. The method of claim 1, wherein categorizing the received signal contributions comprises determining an average power of the received signal contributions.

4. The method of claim 1, wherein the method is executed at least at one of a startup of the wireless communication system, a predefined interval, an introduction of nodes to the wireless communication system, and a removal of nodes from the wireless communication system.

5. The method of claim 4, wherein the predefined interval is between 1 second and 3 hours.

6. The method of claim 4, wherein the predefined interval is between 1 minute and 1 hour.

7. A wireless communication system employing the method of claim 1.

8. The wireless communication system of claim 7, wherein the plurality of nodes are wirelessly connected to a wireless communication device to form a wireless network, and
   wherein the wireless network is a wireless mesh network.

9. The wireless communication system of claim 7, wherein the predefined frequency range comprises at least one of the 2.4 GHz Industrial, Scientific, and Medical (ISM) frequency band and the 5.8 GHz ISM frequency band.

10. A wireless communication device for wireless communication in a wireless communication system, the wireless communication device comprising:
    an antenna;
    a receiver module connected to the antenna and configured to receive signal contributions from within a predefined frequency range;
    a control unit connected to the receiver module and configured to categorize the received signal contributions in a plurality of different frequency bands being sub-bands of the predefined frequency range, compare content in each of the plurality of sub-bands with a predetermined criteria, select a sub-set of the plurality of sub-bands corresponding to the predetermined criteria, determine a frequency hopping pattern based on the selected sub-set of sub-bands, and generate a frequency key comprising information as to the selected sub-set of sub-bands and the frequency hopping pattern; and
    a transmitter module connected to the control unit and the antenna and configured to broadcast the frequency key to a plurality of nodes of the wireless communication system.

11. The wireless communication device of claim 10, wherein the predefined frequency range comprises at least one of the 2.4 GHz Industrial, Scientific, and Medical (ISM) frequency band and the 5.8 GHz ISM frequency band.

12. The wireless communication device of claim 10, wherein categorizing the received signal contributions comprises determining an average power of the received signal contributions.

13. The wireless communication device of claim 10, wherein the wireless communication device is a wireless transceiver.

14. A wireless communication system, comprising:
the wireless communication device of claim 10, and
the plurality of nodes wirelessly connected to the wireless communication device for forming a wireless network.

15. The wireless communication system of claim 14, wherein the wireless network is a wireless mesh network.

16. A method for wireless communication in a wireless communication system, the method comprising:
receiving signal contributions from within a predefined frequency range;
categorizing the received signal contributions in a plurality of different frequency bands being sub-bands of the predefined frequency range;
comparing content in each of the plurality of sub-bands with a predetermined criteria;
selecting a sub-set of the plurality of sub-bands corresponding to the predetermined criteria;
determining a frequency hopping pattern based on the selected sub-set of sub-bands;
generating a frequency key comprising information as to the selected sub-set of sub-bands and the frequency hopping pattern;
broadcasting the frequency key to a plurality of nodes of the wireless communication system;
determining a level of reception; and
generating the frequency key if the level of reception is below a predetermined threshold.

17. A wireless communication system employing the method of claim 16.

18. The wireless communication system of claim 17, wherein the plurality of nodes are wirelessly connected to a wireless communication device to form a wireless network, and
wherein the wireless network is a wireless mesh network.

19. The wireless communication system of claim 17, wherein the predefined frequency range comprises at least one of the 2.4 GHz Industrial, Scientific, and Medical (ISM) frequency band and the 5.8 GHz ISM frequency band.

20. A wireless communication device for wireless communication in a wireless communication system, the wireless communication device comprising:
an antenna;
a receiver module connected to the antenna and configured to receive signal contributions from within a predefined frequency range;
a control unit connected to the receiver module and configured to categorize the received signal contributions in a plurality of different frequency bands being sub-bands of the predefined frequency range, compare content in each of the plurality of sub-bands with a predetermined criteria, select a sub-set of the plurality of sub-bands corresponding to the predetermined criteria, determine a frequency hopping pattern based on the selected sub-set of sub-bands, and generate a frequency key comprising information as to the selected sub-set of sub-bands and the frequency hopping pattern; and
a transmitter module connected to the control unit and the antenna and configured to broadcast the frequency key to a plurality of nodes of the wireless communication system;
wherein the control unit is further configured to determine a level of reception and to generate the frequency key if the level of reception is below a predetermined threshold.

* * * * *